(12) United States Patent
Srivastava et al.

(10) Patent No.: US 12,277,541 B2
(45) Date of Patent: Apr. 15, 2025

(54) METHODS AND SYSTEMS FOR EXTENDING INSTALLMENT OPTIONS

(71) Applicant: MASTERCARD ASIA/PACIFIC PTE. LTD., Singapore (SG)

(72) Inventors: Abhinava Srivastava, Singapore (SG); Timothy Fletcher, Killarney Heights (AU)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 6 days.

(21) Appl. No.: 17/865,347

(22) Filed: Jul. 14, 2022

(65) Prior Publication Data

US 2024/0020674 A1 Jan. 18, 2024

(51) Int. Cl.
G06Q 20/22 (2012.01)
G06Q 20/38 (2012.01)
G06Q 20/40 (2012.01)

(52) U.S. Cl.
CPC ........... *G06Q 20/29* (2013.01); *G06Q 20/389* (2013.01); *G06Q 20/401* (2013.01)

(58) Field of Classification Search
CPC ..... G06Q 20/29; G06Q 20/389; G06Q 20/401
USPC .......................................................... 705/35
See application file for complete search history.

(56) References Cited

U.S. PATENT DOCUMENTS

| | | |
|---|---|---|
| 2009/0112729 A1 | 4/2009 | Shah |
| 2011/0004546 A1 | 1/2011 | Thomas |
| 2012/0046958 A1 | 2/2012 | Pynadath et al. |
| 2012/0143752 A1* | 6/2012 | Wong ................ G06Q 20/4012 705/41 |
| 2012/0166311 A1 | 6/2012 | Dwight et al. |
| 2014/0359298 A1 | 12/2014 | Carlson et al. |
| 2015/0026037 A1 | 1/2015 | Thompson et al. |
| 2016/0323259 A1 | 11/2016 | Carlson et al. |
| 2017/0046693 A1 | 2/2017 | Haldenby et al. |

(Continued)

FOREIGN PATENT DOCUMENTS

WO WO2022/268908 12/2022

OTHER PUBLICATIONS

Colendi: https://www.colendi.com/; web accessed Feb. 25, 2022; 5 pgs.

(Continued)

*Primary Examiner* — Bennett M Sigmond
*Assistant Examiner* — Michael J Warden
(74) *Attorney, Agent, or Firm* — Harness, Dickey & Pierce, P.L.C.

(57) ABSTRACT

Systems and methods are provided for extending installment options to users. One example computer-implemented method includes, as part of an authentication challenge to a user for a transaction, requesting, by a communication device of the user, installment options from an installment service provider (ISP) based on an identifier specific to a first party involved in the transaction. In response, the ISP retrieves the requested installment options and provides them to the communication device. The method also includes displaying, by the communication device, the installment options to the user, soliciting a selection of one of the installment options, and, in response to the selection, identifying the selected one of the installment options to the ISP, whereby the ISP records the selected installment option as payment for the transaction.

10 Claims, 4 Drawing Sheets

(56) References Cited

U.S. PATENT DOCUMENTS

| | | | |
|---|---|---|---|
| 2017/0193497 A1 | 7/2017 | Macedo et al. | |
| 2017/0221040 A1 | 8/2017 | Ringo | |
| 2017/0293669 A1 | 10/2017 | Madhavan et al. | |
| 2017/0295023 A1 | 10/2017 | Madhavan et al. | |
| 2017/0323280 A1* | 11/2017 | Desilva | G06Q 20/102 |
| 2018/0181953 A1 | 6/2018 | Lacoss-Arnold et al. | |
| 2018/0026838 A1 | 9/2018 | Wasserman | |
| 2018/0293573 A1 | 10/2018 | Ortiz et al. | |
| 2019/0156413 A1* | 5/2019 | Bhargava | G06Q 20/10 |
| 2019/0392450 A1* | 12/2019 | Gosset | H04L 63/101 |
| 2020/0074434 A1* | 3/2020 | Chen | G06Q 20/24 |
| 2020/0117690 A1 | 4/2020 | Tran et al. | |
| 2020/0259643 A1 | 8/2020 | Pazhoor et al. | |
| 2021/0256070 A1 | 8/2021 | Tran et al. | |
| 2021/0279253 A1 | 9/2021 | Madhavan et al. | |
| 2022/0012672 A1 | 1/2022 | Inman et al. | |
| 2022/0020015 A1 | 1/2022 | Ortiz et al. | |
| 2022/0114571 A1 | 4/2022 | Ortiz et al. | |
| 2022/0122087 A1* | 4/2022 | Gosset | G06Q 20/027 |
| 2022/0173893 A1 | 6/2022 | Basu et al. | |
| 2022/0270085 A1 | 8/2022 | Mee | |
| 2022/0270725 A1 | 8/2022 | DeRosa-Grund | |
| 2022/0303258 A1 | 9/2022 | Mee et al. | |
| 2022/0391883 A1 | 12/2022 | Ortiz et al. | |
| 2022/0391887 A1 | 12/2022 | Jakobsson et al. | |
| 2023/0006976 A1 | 1/2023 | Jakobsson et al. | |
| 2023/0063172 A1 | 3/2023 | Liberman | |
| 2023/0074653 A1 | 3/2023 | Mawson | |
| 2023/0086191 A1 | 3/2023 | Jakobsson | |
| 2023/0114684 A1 | 4/2023 | Jakobsson et al. | |
| 2023/0196355 A1 | 6/2023 | Ortiz | |
| 2023/0230066 A1 | 7/2023 | Jakobsson et al. | |
| 2023/0230091 A1 | 7/2023 | Vaughn | |
| 2023/0281583 A1 | 9/2023 | Jakobsson et al. | |
| 2023/0289768 A1* | 9/2023 | Pinto | G06Q 40/03 |
| 2023/0297992 A1* | 9/2023 | Davis | G06Q 20/367 705/39 |
| 2023/0300394 A1* | 9/2023 | Sain | H04N 21/41422 715/719 |
| 2023/0385815 A1 | 11/2023 | Jakobsson et al. | |

OTHER PUBLICATIONS

RCN Network; RON—Global Lending (ripiocredit.network): © 2018-2020; 8 pgs.

NPA Management Using Blockchain; Microsoft Word—Manas 1927813 MT.docx (ssrn.com): Mar. 31, 2021; 3 pgs.

Applying Blockchain to Automate Installments Payment between Supply Chain Parties; https://www.researchgate.nel/publication/ 330945538 Applying Blockchain to Automate Installments Payment between Supply Chain Parties: Dec. 1, 2018; 5 pgs.

Lay-Buy App; (https://lay-buys.com/); web accessed Aug. 31, 2020; 2 pgs.

* cited by examiner

Merchant Name
ORDER TOTAL
$5,200

Bank 1
Full interest paid by Bank

SELECT TENURE

○ $1733 for 3 months

○ $867 for 6 months

○ $578 for 9 months

○ $434 for 12 months

FIG. 4

METHODS AND SYSTEMS FOR EXTENDING INSTALLMENT OPTIONS

FIELD

The present disclosure generally relates to methods and systems for use in extending installment options to users.

BACKGROUND

This section provides background information related to the present disclosure which is not necessarily prior art.

Users are known to acquire products (e.g., goods and services, etc.) through purchases from merchants. Often, the users fund the purchases through cash, credit, or checks, whereby the users pay full amounts for the purchases and take delivery of the products. When the users pay with credit cards, for example, the users may later make one or more payments to issuers of the credit cards to reimburse the issuers for the full amounts of the purchases (with interest applied according to terms). In addition, it is known for merchants to offer layaway programs to users, whereby the users pay the merchants for the products over a period of time and the products are held by the merchants until all payments are made.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

When making purchases from merchants, users have different options to fund the purchases, including, for example, cash, credit cards, checks, etc. Installment payments are another option. In connection with installment payments, terms are typically offered to users at the time of purchase, in the form of conventional contracts. The users are then permitted to accept the terms whereby the users are responsible to make payments according to the terms. For example, in selecting an installment option for a purchase at a merchant, a user may be required to initiate four payments over a defined interval, to the merchant, whereby the purchase becomes fully funded. Alternatively, installment options may be provided apart from the merchants, whereby third-party installment providers unrelated to the merchants fund the transactions on behalf of the users, and then the users repay the third party providers thought installment payments according to associated terms. Due to a lack of integration of installment options with a payment process (e.g., a payment transaction, etc.), though, installment options may be limited and cumbersome for users, and for merchants, often resulting in friction in coordinating the transactions, etc. Additionally, or alternatively, integration of installment payments with existing checkout functionality of merchants may be specialized, tedious, and potentially, difficult to use, manage, etc.

Uniquely, the systems and methods herein provide for integration of installment options into enhanced authentication messaging imposed on certain types of transactions. In particular, for transactions subjected to enhanced authentication (e.g., 3D/secure authentication, etc.), the transactions are separated into authentication sequences followed by authorization sequences. As part of the authentication sequences, users may be subject to challenge questions, or other "step-up" types of challenges in connection with authenticating the users (e.g., for certain transactions, etc.). In connection therewith, as part of such a transaction and associated user interaction, one or more installment options may be presented to a user (e.g., in addition to the challenge questions, etc.), whereby selection of one of the installment options enables an installment agreement between the user and an installment provider (e.g., a third-party, an issuer, etc.), whereby the installment option is setup (e.g., generally automatically, etc.), payment is made to the merchant (e.g., as part of the following authorization sequence, etc.), and/or repayment is scheduled. In this manner, the merchant, and more specifically, the merchant checkout functionality, is undisturbed, yet additional options are offered to the user, for example, for installment payments. The extended functionality, therefore, layers onto the existing infrastructure of enhanced authentication, whereby the merchant is able to extend funding options to the user while avoiding associated changes to the merchant's infrastructure, thereby providing extending flexibility to the infrastructure, as a whole.

Figure 1:
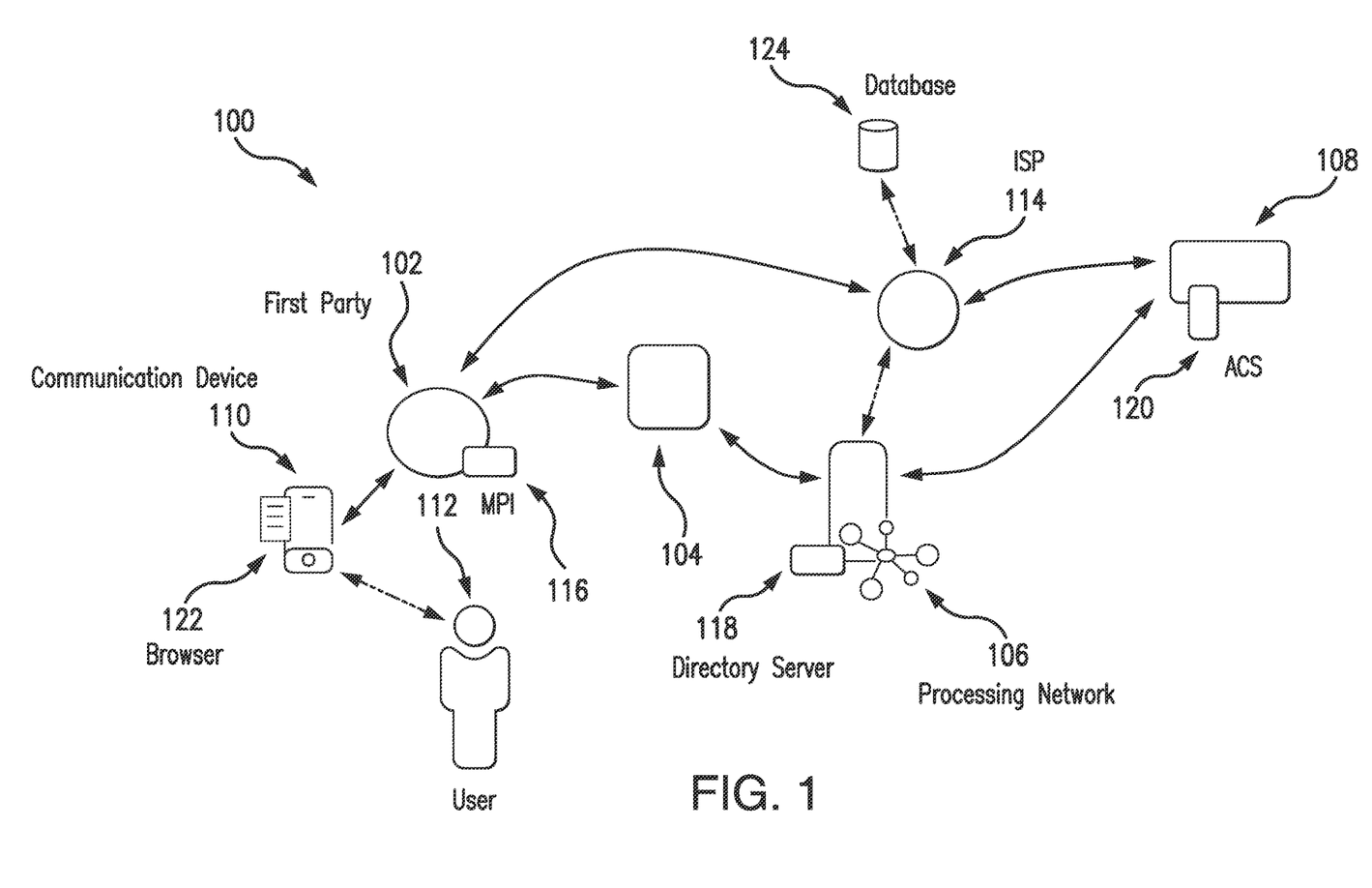
FIG. 1 is an example system of the present disclosure operable to provide installment options to users in connection with interactions by users at virtual locations.

FIG. 1 illustrates an example system 100 in which one or more aspects of the present disclosure may be implemented. Although the system 100 is presented in one arrangement, other embodiments may include systems arranged otherwise depending, for example, on parties included in the system 100, processing of funding options, privacy rules and/or requirements, etc.

The illustrated system 100 generally includes a first party 102, an acquirer 104 associated with the first party 102, a processing network 106, and an issuer 108, each of which is coupled to (and is in communication with) one or more networks (as generally indicated by the arrowed lines in FIG. 1). The one or more networks may each include, without limitation, a local area network (LAN), a wide area network (WAN) (e.g., the Internet, etc.), a mobile network, a virtual network, and/or another suitable public and/or private network capable of supporting communication among two or more of the parts of the system 100 illustrated in FIG. 1, or any combination thereof. For example, one such network may include multiple different networks, such as a private network made accessible by the processing network 106 to the acquirer 104 and the issuer 108 and, separately, the public Internet, which is accessible as desired to the first party 102, the acquirer 104, the issuer 108, and a user 112 (or specifically, a communication device 110 associated with the user 112), etc.

The first party 102 in the system 100 is configured to offer for sale and to sell products to consumers including, for example, to the user 112. In connection therewith, the first party 102 may include a merchant, etc. What's more, the first party 102 may be disposed and/or accessible at one or more physical locations, such as, for example, at one or more brick-and-mortar locations, and/or at one or more virtual locations, for example, via one or more e-commerce platforms (e.g., a website, network-based application, etc.). In this specific embodiment, the user 112 interacts with the first party 102 through an e-commerce platform. In connection therewith, the user 112 may add one or more products offered for sale by the first party 102 to a virtual shopping cart at the e-commerce platform of the first party 102, and then select an option to checkout to purchase the one or more products, as described in more detail below.

The acquirer 104 and issuer 108 of the system 100 are financial institutions, which commonly issue accounts to various parties. In the context of FIG. 1, for example, the acquirer 104 has issued an account to the first party 102, whereupon funds from the purchase of products by users at the first party 102 (e.g., via payment account transactions at the e-commerce platform of the first party 102, etc.) may be deposited into the first party's account. The issuer 108 is configured to issue one or more payment accounts (e.g., credit accounts, debit accounts, prepaid accounts, etc.) to users, including the user 112. The payment accounts are often linked to payment devices, such as card devices, virtual wallets, tokens, etc., whereby the users may then use the payment devices to effect purchases funded by the payment accounts.

The processing network 106 is configured to authorize, clear, and settle transactions, for example, between acquirers (e.g., the acquirer 104, etc.) and issuers (e.g., the issuer 108c, etc.), etc., as described in more detail below. The processing network 106 may include, for example, the MASTERCARD processing network, etc.

In this example embodiment, the processing network 106 includes, or is associated with, an installment service provider (ISP) 114, which is configured to coordinate installment options for users, in connection with transaction at the first party 102, as described in more detail below. The ISP 114 may be included, in whole or in part, in the processing network 106, or may be separate therefrom, as either a standalone entity or integrated, in whole or in part, with another entity illustrated in FIG. 1 (e.g., with the issuer 108, etc.) (or otherwise), etc.

In addition, the system 100 is configured to provide enhanced authentication for transactions at the first party 102. The enhanced authentication may include, for example, 3D Secure authentication (e.g., Verified-by-VISA offered by VISA, Secure Code offered by MASTERCARD, etc.), etc. In connection therewith, in this embodiment, the first party 102 is associated with a merchant plug-in (MPI) 116. The MPI 116 generally includes a software module executed by the first party 102 (i.e., a computing device thereof). And, the processing network 106 is associated with, or includes, a directory server 118, and the issuer 108 is associated with, or includes, an access control server (ACS) 120.

The communication device 110 is a computing device, generally, which may include, for example, a smartphone, tablet, laptop, etc., and may alternatively include a desktop computer, server, etc., in other embodiments. In the system 100, the communication device 110 includes a web browser 122, which configures the communication device 110 to access and to display web pages. The web browser 122 may include, for example, Microsoft Edge, Google Chrome, Apple Safari, etc. In at least one embodiment, the communication device 110 may include a mobile application associated with the first party 102, in lieu of, or in addition to, the web browser 122.

While only one first party 102 and one user 112 are illustrated in FIG. 1, it should be appreciated that any number of first parties and/or users, as described herein, may be included in other embodiments. Likewise, a different number of MPIs, acquirers, processing networks, directory servers, issuers, and ACSs may be included in other system embodiments. In still other embodiments, different first parties may have different acquirers, and different users may employ payment accounts issued by multiple different issuers.

In this example embodiment, in connection with a transaction at the first party 102, the user 112 accesses the e-commerce platform of the first party 102, via the web browser 122. When the user 112 adds products to a shopping cart and proceeds to checkout, the user 112 enters and/or otherwise provides at least one payment account credential (from a payment account) (e.g., a primary account number (PAN), a token, an expiration date, etc.) to the first party 102 (via the e-commerce platform, etc.). Based on the at least one payment account credential (e.g., based on the at least one payment account credential being within a predefined range of credentials, etc.), or based on a default requirement by the first party 102 (e.g., based on the transaction taking place through the e-commerce platform, based on a liability shift for the transaction away from the first party 102, etc.), or based on one or more aspects of the transaction itself, the first party 102 determines that authentication of the user 112 is to be performed.

As such, the first party 102 is configured, by the MPI 116, via the e-commerce platform, to compile and transmit an authentication request (AReq) for the transaction to the directory server 118, where the AReq includes details of the purchase (e.g., a payment account credential, a transaction amount, and an identifier of the first party 102 (e.g., a merchant ID, etc.), etc.). The directory server 118 is configured to then transmit the AReq to the ACS 120 (as associated with the issuer 108 of the payment account involved in the transaction). The ACS 120, then, is configured to compile and transmit an authentication response (ARes) to the MPI 116, via the directory server 118. It should be appreciated that in the context of the transaction, any aspect of the transaction (e.g., membership of the first party 102 in a group, a type of the transaction, a type of the first party 102, an ID associated with the first party 102 (e.g., a merchant ID, etc.), etc.) may be used by the ACS 120 (or, potentially, the directory server 118) to designate the transaction for a "step up" as part of enhanced authentication (for example, based on a liability shift and/or scoring of the transaction), whereby the enhanced interaction with the user 112 is imposed. The ARes generally includes a network address to be called by the first party 102 and/or the MPI 116. In response, the communication device 110 is configured, by the MPI 116, via the e-commerce platform and the web browser 122, to access the network address, whereby the payment account credentials, the amount and the identifier of the first party 102, for example, are provided to the issuer 108.

In turn, the issuer 108 is configured to provide a web page for the authentication challenge, which herein additionally includes an installment request (e.g., a request for an option (or options) for installment payments for the transaction, etc.), to the communication device 110. That is, the web page is loaded by the issuer 108, at the communication device 110, in response to the AReq from the first party 102.

The communication device 110 is configured, by the web browser 122, to display the web page to the user. The user 112 may provide the appropriate authentication response (e.g., a one-time passcode (OTP), etc.) to the challenge question to facilitate authentication of the user 112. In addition herein, the web page includes a software development kit (SDK) (or cloud development kit (CDK)) associated with the ISP 114, which provides/displays an instalment option to the user 112 (as part of the web page). The user 112 may then select the installment request, or not.

In the situation where the user 112 selects the installment request (or feature), the communication device 110 is configured, by the web browser 122 and the SDK, to call the ISP 114 (e.g., via an application programming interface (API), etc.) with the payment account credential, the transaction amount, and the identifier of the first party 102, etc. In response, the ISP 114 is configured to offer one or more installment options for the user 112 to fund the transaction. The options may include a number of payments, a frequency of payments or payment schedule, an interest rate and/or installment fee, etc. Optionally, the ISP 114 may be configured to look-up the first party 102 to determine eligibility, or potentially, installment options for the transaction (e.g., some parties may have preferred and/or predefined installment terms over other parties, etc.). Alternatively, when the user 112 declines the one or more installment options (or declines the installment request (or feature) in general), the authentication proceeds with the user's response to the challenge.

In addition when the user 112 selects an installment option, the ISP 114 is configured to store the user selection in a database 124, and then, the authentication proceeds with the user's response to the challenge. In connection with storing the user's selection, the ISP 114 is configured to generate a loan account associated with the terms of the selected installment option, along with details of the transaction (e.g., identifier of the first party 102, transaction ID, etc.), and to append an entry for the installment option to a data structure associated with the issuer 108.

Consistent with the above, in response to the appropriate authentication response (as part of the underlying advanced authentication), the communication device 110 is configured to provide the response back to the issuer 108 (e.g., the OTP, etc.). The issuer 108, in turn, is configured to determine whether to authenticate the user 112 in connection with the transaction. Thereafter, the issuer 108 is configured to provide a response to the directory server 118 and/or the MPI 116, in the form of a verification value. The first party 102 is then configured to continue in the transaction, whereby the verification value is included in the authorization request from the first party 102 to the issuer 108, via the acquirer 104 and the processing network 106. The authorization request and transaction then proceed in a conventional manner, based on the at least one payment account credential provided at checkout. In this way, if an installment option is not selected, the transaction is directed to (and funded by) the payment account of the user 112 associated with the at least one payment account credential. However, if an installment option is selected, the transaction still proceeds based on the at least one payment account credential. However, the ISP 114 is configured to convert the transaction into installments (e.g., a first installment payment with subsequent payments to then follow, etc.) consistent with the selected installment option at a platform associated with the issuer 108 (e.g., the transaction is converted into instalments on the issuer platform as a new loan account for repayment by the user 112, etc.). In this way, the transaction proceeds in accordance with the selected installment option (with an installment account created with the issuer 108 or other issuer associated with the installment option, which is paid by the payment account of the issuer per the installments) and not a single payment to the payment account of the user 112 provided at checkout.

Further, at a later time, as defined by the installment terms, an installment payment is initiated. In particular, in this example embodiment, the ISP 114 is configured to initiate a payment transaction for the installment to the payment account of the user 112, which is issued by the issuer 108. The transaction, through authorization, clearing and settlement, causes funds to be transferred from the issuer 108, and specifically the user's account, to the ISP 114 which funded the original transaction upon which the installment is based.

Figure 2:
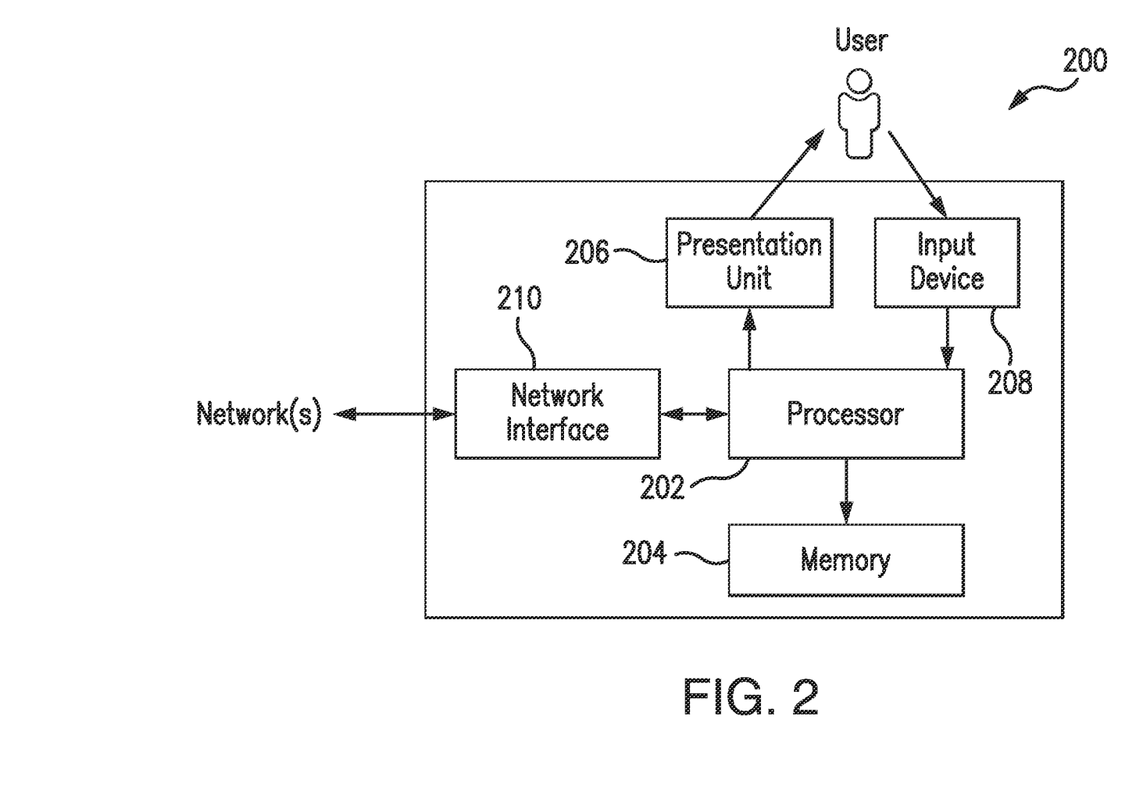
FIG. 2 is a block diagram of an example computing device that may be used in the system of FIG. 1.

FIG. 2 illustrates an example computing device 200 that may be used in the system 100. The computing device 200 may include, for example, one or more servers, workstations, personal computers, laptops, tablets, smartphones, PDAs, terminals, virtual machines, etc. In addition, the computing device 200 may include a single computing device, or it may include multiple computing devices located in close proximity or distributed over a geographic region, so long as the computing devices are specifically configured to function as described herein. In the system 100 of FIG. 1, each of the first party 102, the acquirer 104, the processing network 106, the issuer 108, the communication device 110, the ISP 114, the MPI 116, the directory server 118, and the ACS 120, etc. may include or may be implemented in a computing device (or multiple computing devices) consistent with computing device 200 coupled to (and in communication with) one or more networks. That said, the system 100, or parts thereof, should not be understood to be limited to the computing device 200, as other computing devices may be employed in other system embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permits data, instructions, etc. to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable storage media. The memory 204 may be configured to store, without limitation, transaction data, eligibility parameters, installment parameters, identifying data, rules, and/or other types of data (and/or data structures) as needed and/or suitable for use as described herein. Furthermore, in various embodiments, computer-executable instructions may be stored in the memory 204 for execution by the processor 202 to cause the processor 202 to perform one or more of the functions described herein (e.g., one or more of the operations of method 300, etc.), such that the memory 204 is a physical, tangible, and non-transitory computer readable storage media. Such instructions often improve the efficiencies and/or performance of the processor 202 that is performing one or more of the various operations herein, whereby such performance may transform the computing device 200 into a special purpose computing device. It should be appreciated that the memory 204 may include a variety of different memories, each implemented in one or more of the operations or processes described herein.

In the example embodiment, the computing device 200 includes a presentation unit 206 that is coupled to (and that is in communication with) the processor 202 (however, it should be appreciated that the computing device 200 could include output devices other than the presentation unit 206, etc.). The presentation unit 206 outputs information (e.g., installment options, etc.), either visually or audibly, to a user of the computing device 200, for example, the user 112 in the system 100, etc. In connection therewith, various interfaces (e.g., as defined by network-based applications, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

The computing device 200 also includes an input device 208 that receives inputs from the user (i.e., user inputs) such as, for example, selections of installment options, payment accounts, etc. by user 112, or inputs from other computing devices. The input device 208 is coupled to (and is in communication with) the processor 202 and may include, for example, a keyboard, a pointing device, a mouse, a stylus, a touch sensitive panel (e.g., a touch pad or a touch screen, etc.), another computing device, and/or an audio input device. Further, in various example embodiments, a touch screen, such as that included in a tablet, a smartphone, or similar device, may behave as both the presentation unit 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network(s) of the system 100. Further, in some example embodiments, the computing device 200 may include the processor 202 and one or more network interfaces incorporated into or with the processor 202.

Figure 3:
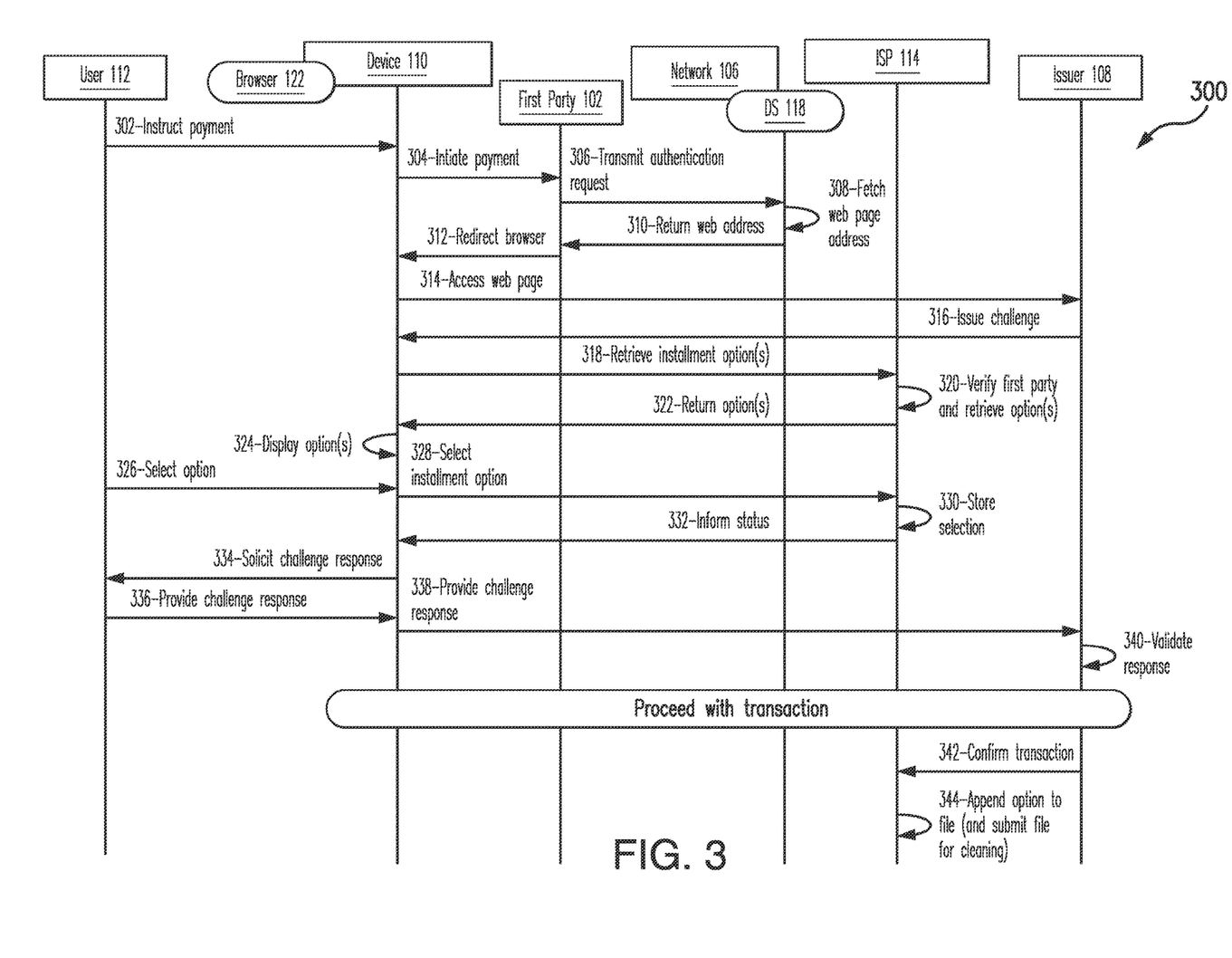
FIG. 3 is an example method, which may be used with the system of FIG. 1, for providing installment options to users in connection with enhanced authentication of the users as part of interactions by the users at virtual locations.

FIG. 3 illustrates an example method 300, for use in providing the user 112, for example, with installment options, in connection with a purchase by the user 112 at the first party 102. The example method 300 is described as implemented in the system 100, and more particularly, in the network 106, communication device 110, and ISP 114. Additional reference is also made to the computing device 200. Nonetheless, it should be understood that the methods herein are not limited to the system 100 and/or the computing device 200. Likewise, the systems, devices, and interfaces herein should not be understood to be limited to the method 300.

At the outset, the user 112 browses one or more products (e.g., goods, services, etc.) at the virtual location of the first party 102, via the communication device 110 (and the browser 122), and the user 112 selects one or more products to purchase, for example, by adding the product(s) to s shopping cart. Thereafter, at 302, the user 112 provides an instruction to purchase the products at the communication device 110. The instruction, received from the user 112, may include, for example, the user 112 providing an account number (e.g., a PAN, etc.) for a payment account and/or other details of the transaction. In response to the instruction (and/or details provided in connection therewith), the communication device 110, via the browser 122, the virtual location of the first party 102, and the MPI 116, initiates payment with the first party 102, at 304.

In response, the MPI 116 compiles an authentication request (AReq) for the transaction (e.g., as a requirement based on the transaction being initiated through the virtual location of the first party 102, based on the account number provided by the user 112, based on a feature of the transaction, etc.), where the AReq may include, without limitation, an identifier and/or name of the first party 102, the payment account credential (e.g., the PAN, the token, etc.) for the user's payment account, a transaction amount, a unique ID associated with the communication device 110, etc. What's more, the AReq is provided/configured to include many different data elements, which may include mandatory, conditional or optional elements, for example, as defined and/or suggested by the EMV 3DS™ specification, etc. The MPI 116 (as part of the first party 102) then transmits the AReq to the directory server 118, at 306.

Upon receipt of the AReq, the directory server 118 may perform one or more verification operations (to determine whether to permit the transaction to proceed, or not), and also fetches, at 308, a web page address associated with the issuer 108 (i.e., the issuer of the payment account identifier by the credential included in the AReq). More specifically, in this example, the directory server 118 passes the AReq to the ACS 120, which performs a risk analysis, for example, and in this context, determines user authentication as required, i.e., a "step up". In connection therewith, the ACS 120 provides the web page address, for example, loaded from the Mastercard plugin, etc. for displaying the installment options to the user 112.

At 310, the directory server 118 provides the web page address, as part of an authentication response (ARes), to the first party 102, and specifically, the MPI 116. In turn, the first party 102, and in particular, the MPI 116 redirects, at 312, the browser 122 of the user's communication device 110 to the web page address included in the ARes, and the communication device 110 accesses the web page, at 314, thereby providing interaction between the user's communication device 110 and the issuer 108. The web page address is associated with a web page including a challenge, which is issued by the issuer 108 (e.g., via the ACS 120, etc.) to the user 112, at 316, as a mechanism for the user 112 to provide an authentication input.

The web page also includes an installment capability, which, when executed by the browser 122 at the communication device 110, causes the communication device 110 to retrieve, at 318, installment options from the ISP 114. In doing so, the communication device 110 provides the identifier of the first party 102 (and other data elated to the first party 102, as needed or desired), the transaction amount for the instant transaction, and potentially, data associated with the payment account of the user 112 (e.g., the PAN, etc.), etc. In turn, at 320, the ISP 114 verifies the first party 102 (based on the identifier of the first party 102, etc.). The verification may include one or more different lists, such as, for example, a white or inclusion list of parties eligible, enrolled or opting into installment options, or a black or exclusion list of parties excluded, barred from, or opting out of installment options. The verification may be a lookup of the identifier of the first party 102 in the one or more lists, or may include one or more interactions with the first party 102, or the acquirer 104, or another party associated with the transaction, the installment options, the user 112, etc.

When verified, the ISP 114 further retrieves, at 320, one or more installment options based on the first party 102, the user 112, and/or the transaction amount, etc. The one or more installment options may include terms (e.g., number of payments, timing of payments, etc.) and other details related to the installment, or the ISP 114, etc. The installment options, when more than one, may include alternatively options, which may include different terms, such as, for example, varying intervals between installments, different numbers of installments, etc. At 322, the ISP 114 returns the installment option(s) to the communication device 110.

Figure 4:
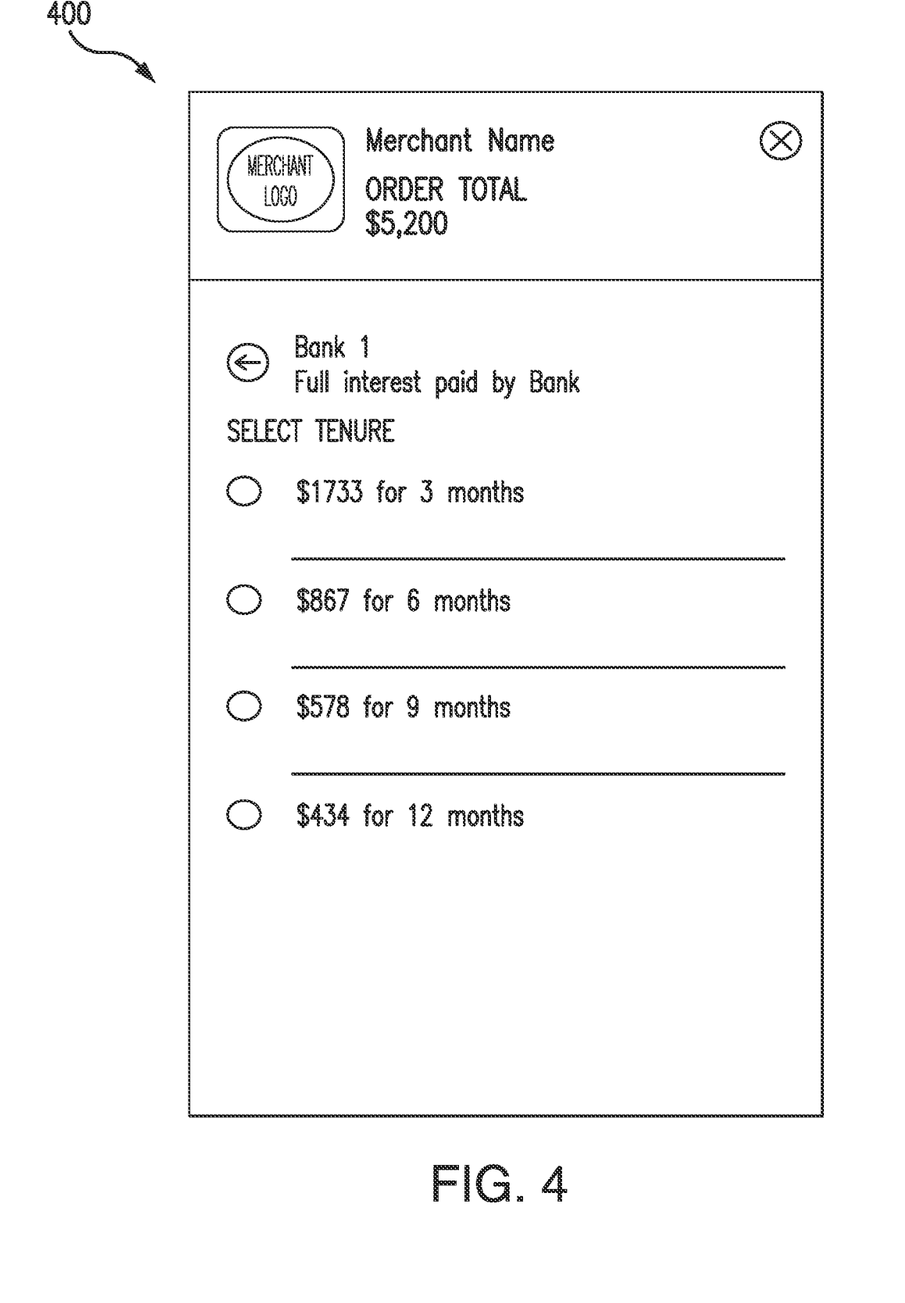
FIG. 4 illustrates an example installment interface that may be displayed to a user, for providing installment options to the user, in connection with the system of FIG. 1 and/or the method of FIG. 3.

In connection therewith, the communication device 110 displays, at 324, the installment options, as part of the web page (and challenge interface, etc.), to the user 112 at the browser 122. The installment option(s) may be displayed in various manners, where the terms of the installment option(s) may be communicated to the user 112, together or separately, as the user 112 selects, scrolls, etc. the different options, one by one. FIG. 4 illustrates an example installment interface 400 that may be displayed to the user 112 at the communication device 110. As shown, the example interface 400 includes an indication of the total transaction amount (e.g., $5,200 in this example, etc.), and a listing of installment options from which the user may select (e.g., four installment options in this example each including monthly payments ranging from three months to twelve months, etc.).

When the user 112 selects one or more of the installment options, at 326, the communication device 110, via the browser 122, selects, at 328, the installment option from the ISP 114. At 330, the ISP 114 stores the selection of the installment option, and terms and/or details thereof, in the database 124, as a record of the selection of the user 112. The ISP 114 then informs, at 332, the communication device 110 of the status of the installment option. The status may include a permission to proceed, or an indication that the selection is complete, etc.

In response, the communication device 110 proceeds, for example, by continuing in the challenge to the user 112 via the web page. In doing so, at 334, the communication device 110, and in particular, the browser 122 and the issuer's web page, solicits a challenge response from the user 112 to a challenge question. The user 112 provides the challenge response, at 336, to the communication device 110. The communication device 110, in turn, provides, at 338, the challenge response back to the issuer 108, via the web page. The issuer 108 validates the response, at 340. The transaction is then permitted to continue, whereby an authentication value (e.g., an AAV, etc.) is provided to the first party 102, and the first party 102 compiles an authorization request for the transaction, which includes the account number for the user's payment account, the transaction amount, the authentication value, and also (in some examples) an indication (or installment indicator, for example, populated into a data element of the authorization request, etc.) of the selection of the installment option. The authorization request and transaction then proceed in a conventional manner, based on the account number provided at checkout for the user's payment account. In this way, in this example, the transaction generally proceeds from the first party 102 to the issuer 108 in a conventional manner based on the user's account number. However, the ISP 114 is configured to convert the transaction into installments consistent with the selected installment option at a platform associated with the issuer 108 (e.g., based on communication with the issuer 108, based on the installment indicator included in the authorization request, etc.) (e.g., the transaction is converted into installments on the issuer platform as a new loan account (created by the issuer 108) for repayment by the user 112, etc.). In this way, the transaction proceeds from the first party 102 in the generally conventional manner (using the existing 3DS flow, etc.), but is modified (e.g., at the issuer platform, etc.) in accordance with the selected installment option whereby funding for the transaction is based on the installment option and not the payment account of the user 112 provided at checkout.

In addition in the illustrated embodiment, the issuer 108 confirms the transaction, at 342, with the ISP 114, thereby permitting the ISP 114 to append, at 344, the installment option to a closing file (if not already done by the issuer 108). At the end of the day, or at another interval, the ISP 114 (or, in some examples, the issuer 108) submits the closing file for clearing and settlement to the processing network 106.

In some embodiments, in the method 300, the issuer 108 (e.g., via the ACS 120, etc.) may solicit a response to the challenge prior to the ISP 114 returning installment options to the user 112. In doing so, the issuer 108 may then first validate the response and, once validated, the communication device 110 may retrieve the installment options. Further, in some embodiments, the installment options may be provided by an issuer (or entity) other than the issuer 108 of the user's payment account. In such embodiments, as described above, the ISP 114 may communicate with both the issuer 108 and the issuer of the selected installment option whereby the issuer of the selected installment option then creates a new account to facilitate payment for the transaction and repayment of the corresponding installments.

In view of the above, the systems and methods herein extend installment options to users, in-line with enhanced authentication. In this manner, the installment options are appended to an existing sequence step included in the enhanced authentication, which limits or eliminates any revision of the first party (e.g., merchant, etc.) involved in the transaction, as the user is connected to the installment service provider (ISP) through the challenge sequence of the enhanced authentication.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the operations recited in the claims including, for example, one or more of the following operations: (a) as part of an authentication challenge to a user for a transaction, requesting one or more installment options from an installment service provider (ISP), based on an identifier specific to a first party involved in the transaction; (b) receiving the requested one or more installment options for funding the transaction; (c) displaying the one or more installment options; (d) soliciting, from the user, a selection of the one or more installment options; and (e) in response to the selection by the user, identifying a selected one of the one or more installment options to the ISP, whereby the ISP records the selected one of the one or more installment options as payment for the transaction.

With that said, example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature, element or layer is referred to as being "on," "engaged to," "connected to," "coupled to," "included with," "associated with," or "in communication with" another feature, element or layer, it may be directly on, engaged, connected, coupled, associated, or in communication with/to the other feature, element or layer, or intervening features, elements or layers may be present. In contrast, when feature, element or layer is referred to as being "directly on," "directly engaged to," "directly connected to," "directly coupled to," "directly associated with," or "directly in communication with" another feature, element or layer, there may be no intervening features, elements or layers present. Other words used to describe the relationship between elements should be interpreted in a like fashion (e.g., "between" versus "directly between," "adjacent" versus "directly adjacent," etc.). As used herein, the term "and/or" and the phrase "at least one of" includes any and all combinations of one or more of the associated listed items.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Although the terms first, second, third, etc. may be used herein to describe various elements and operations, these elements and operations should not be limited by these terms. These terms may be only used to distinguish one element or operation from another element or operation. Terms such as "first," "second," and other numerical terms when used herein do not imply a sequence or order unless clearly indicated by the context. Thus, a first element operation could be termed a second element or operation without departing from the teachings of the example embodiments.

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in extending installment options to users, the method comprising:
   in response to an authentication response (ARes), for a transaction, from a directory server consistent with an EMV 3DS protocol, accessing, by a communication device, via a web browser of the communication device, a web page associated with an issuer of a payment account at a web page address included in the ARes, the web page including a software development kit (SDK) of an installment service provider (ISP);
   receiving, by the communication device, an authentication challenge to a user for the transaction in the web page, issued from an access control server (ACS) of the issuer of the payment account and associated with the transaction, the authentication challenge consistent with the EMV 3DS protocol;
   as part of the authentication challenge for the transaction:
      requesting, by the communication device, via the SDK, one or more installment options from the ISP for funding the transaction, based on an identifier specific to a first party involved in the transaction and a transaction amount;
      receiving, by the communication device, the one or more installment options for funding the transaction;
      displaying, by the communication device, as part of the web page, via the web browser of the communication device, the one or more installment options along with a name of the first party, each of the one or more installment options including an installment amount and an indication of a number of payments;
      soliciting, from the user, by the communication device, a selection of the one or more installment options displayed at the communication device; and
      in response to the selection by the user, at the web page, identifying, by the communication device, a selected one of the one or more installment options to the ISP, whereby the ISP records the selected one of the one or more installment options as payment for the transaction;

soliciting, from the user, by the communication device, a challenge response for the authentication challenge consistent with the EMV 3DS protocol; and in response to the challenge response from the user, communicating, by the communication device, via the web page, the challenge response to the issuer, whereby the user is authenticated and the transaction is then authorized and funded by the selected one of the one or more installment options, in lieu of the payment account.

2. The computer-implemented method of claim 1, wherein displaying the one or more installment options includes displaying terms associated with each of the one or more installment options to the user at a presentation unit of the communication device.

3. The computer-implemented method of claim 1, further comprising: receiving the challenge response from the user, prior to communicating the challenge response, via the web page, to the issuer.

4. The computer-implemented method of claim 1, further comprising:

in response to requesting the one or more installment options, verifying, by the ISP, the first party as eligible for the one or more installment options, based on the identifier specific to the first party; and in response to verifying that the first party is eligible, retrieving, by the ISP, the one or more installment options for the transaction, based on one or more of: the transaction amount, the identifier of the first party, and an account number for the payment account of the user.

5. The computer-implemented method of claim 1, further comprising:

displaying, via the web browser, at least one interface associated with the first party;

receiving a checkout instruction from the user, at the at least one interface; and initiating the transaction with the first party in response to the checkout instruction, whereby the first party submits an authentication request (AReq) for the transaction, the AReq consistent with the EMV 3DS protocol.

6. A system for use in extending installment options to users, the system comprising a communication device including executable instructions, which when executed by at least one processor of the communication device, cause the communication device to:

in response to an authentication response (ARes), for a transaction, from a directory server consistent with an EMV 3DS protocol, access, via a web browser of the communication device, a web page associated with an issuer of a payment account of a user at a web page address included in the ARes, the web page including a software development kit (SDK) of an installment service provider (ISP);

receive an authentication challenge to the user for the transaction in the web page, issued from an access control server (ACS) of the issuer of the payment account of the user and associated with the transaction, the authentication challenge consistent with the EMV 3DS protocol;

as part of the authentication challenge for the transaction; request, via the SDK, one or more installment options from the ISP for funding the transaction, based on an identifier specific to a first party involved in the transaction and a transaction amount;

receive the one or more installment options for funding the transaction;

display, as part of the web page, via the web browser of the communication device, the one or more installment options along with a name of the first party, each of the one or more installment options including an installment amount and an indication of a number of payments;

solicit, from the user, a selection of the one or more installment options displayed at the communication device; and in response to the selection by the user, identify a selected one of the one or more installment options to the ISP, whereby the ISP records the selected one of the one or more installment options as payment for the transaction;

solicit, from the user, a challenge response for the authentication challenge consistent with the EMV 3DS protocol; and in response to the challenge response from the user, communicate the challenge response to the issuer, whereby the user is authenticated and the transaction is then authorized and funded by the selected one of the one or more installment options, in lieu of the payment account.

7. The system of claim 6, wherein the executable instructions, when executed by the at least one processor of the communication device to display the one or more installment options, cause the communication device to display terms associated with each of the one or more installment options to the user at a presentation unit of the communication device.

8. The system of claim 6, wherein the executable instructions, when executed by the at least one processor of the communication device, further cause the communication device to:

receive the challenge response from the user, prior to communication of the authentication response to the issuer.

9. The system of claim 6, wherein the executable instructions, when executed by the at least one processor of the communication device, further cause the communication device to:

display, via the web browser, at least one interface associated with the first party;

receive a checkout instruction from the user, at the at least one interface; and initiate the transaction with the first party in response to the checkout instruction, whereby the first party submits an authentication request (AReq) for the transaction, the AReq consistent with the EMV 3DS protocol.

10. The system of claim 6, further comprising the ISP; wherein the ISP is configured to:

in response to requesting the one or more installment options, verify the first party is eligible for the one or more installment options, based on the identifier specific to the first party; and in response to verifying that the first party is eligible, retrieve the one or more installment options for the transaction, based on one or more of: the transaction amount, the identifier of the first party, and an account number for the payment account of the user.

* * * * *